US008163065B2

(12) United States Patent
Lackner et al.

(10) Patent No.: US 8,163,065 B2
(45) Date of Patent: *Apr. 24, 2012

(54) CARBON DIOXIDE PERMEABLE MEMBRANE

(75) Inventors: Klaus S. Lackner, Dobbs Ferry, NY (US); Alan C. West, Tenafly, NJ (US); Jennifer L. Wade, Hightstown, NJ (US)

(73) Assignee: The Trustees of Columbia University in the City of New York, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/052,392

(22) Filed: Mar. 21, 2011

(65) Prior Publication Data

US 2011/0268636 A1    Nov. 3, 2011

Related U.S. Application Data

(63) Continuation of application No. 11/874,707, filed as application No. PCT/US2006/014496 on Apr. 18, 2006, now Pat. No. 7,909,911.

(60) Provisional application No. 60/672,399, filed on Apr. 18, 2005.

(51) Int. Cl.
*B01D 53/22* (2006.01)

(52) U.S. Cl. .............. 95/51; 95/43; 95/44; 95/45; 96/4; 96/5; 96/10; 96/11; 264/43; 264/44; 264/681

(58) Field of Classification Search .............. 95/43, 44, 95/45, 49, 51, 52; 96/4, 5, 10, 11; 429/400, 429/472, 479, 488, 535; 264/41, 43, 44, 264/603, 628, 681; 210/500.25
See application file for complete search history.

(56) References Cited

U.S. PATENT DOCUMENTS

| 3,847,672 | A | 11/1974 | Trocciola et al. |
| 4,297,419 | A | 10/1981 | Nickols, Jr. et al. |
| 4,318,714 | A | 3/1982 | Kimura et al. |
| 4,478,776 | A | 10/1984 | Maricle et al. |
| 4,659,635 | A | * 4/1987 | Reiser et al. .................. 429/460 |
| 4,761,164 | A | 8/1988 | Pez et al. |
| 6,200,697 | B1 | 3/2001 | Pesavento |
| 6,514,314 | B2 | 2/2003 | Sirman et al. |

(Continued)

OTHER PUBLICATIONS

Stern, A. S., "Polymers for gas separations: the next decade," Journal of Membrane Science, vol. 94(1): p. 1-65, 1994.

(Continued)

*Primary Examiner* — Jason M Greene
(74) *Attorney, Agent, or Firm* — Wiggin and Dana LLP; Anthony P. Gangemi

(57) ABSTRACT

A carbon dioxide permeable membrane is described. In some embodiments, the membrane includes a body having a first side and an opposite second side; a plurality of first regions formed from a molten carbonate having a temperature of about 400 degrees Celsius to about 1200 degrees Celsius, the plurality of first regions forming a portion of the body and the plurality of first regions extending from the first side of the body to the second side of the body; a plurality of second regions formed from an oxygen conductive solid oxide, the plurality of second regions combining with the plurality of first regions to form the body and the plurality of second regions extending from the first side of the body to the second side of the body; and the body is configured to allow carbon dioxide to pass from the first side to the second side.

20 Claims, 3 Drawing Sheets

U.S. PATENT DOCUMENTS 6,793,711 B1    9/2004    Sammells
7,909,911 B2 *   3/2011    Lackner et al. .................. 95/51

OTHER PUBLICATIONS

Marchese, J., et al., "Gas sorption, permeation and separation of ABS copolymer membrane," Journal of Membrane Science, vol. 221 (1-2): p. 185-197, 2003.

Nakagawa, K., et al., "A Novel Method of CO2 Capture from High Temperature Gases," J. Electrochem Soc., vol. 145, p. 1344-1346, 1998.

Ida, J.-I, et al., "Mechanism of High Temperature CO2 Sorption on Lithium Zirconate," Environmental Science Technology, vol. 37(9): p. 1999-2004, 2003.

Nair, B. N., et al., "Processing of Lithium Zirconate for Applications in Carbon Dioxide Separation: Structure and Properties of Powders," Journal of the American Ceramic Society, vol. 87(1): p. 68-74, 2004.

"CRC Handbook of Chemistry and Physics," 72nd ed. Special Student Edition, ed. D. R. Lide; 1991-1992, Boca Raton: CRC Press, p. 5-9, 5-3.

Cooper, J. F., et al., "Reactions of the Carbon Anode in Molten Carbonate Electrolyte, in Direct Carbon Fuel Cell Workshop," NETL: Pittsburgh, PA 2003.

Singhal, S. C., "Science and Technology of Solid-Oxide Fuel Cells," MRS Bulletin, p. 16-21, 2000.

Lin, S. et al., "Innovative Hydrogen Production by Reaction Integrated Novel Gasification Process (HyPR-Ring), " Proceedings of the Advanced Clean Coal Technology International Symposium '99, Nov. 1-2, 1999, Tokyo.

Balasubramanian, B., et al., Hydrogen from Methane in a Single-Step Process, Chemical Engineering Science 54, p. 3543-3552, 1999.

O'Connor, W. K., et al., "CO2 Storage in Solid Form: a Study of Direct Mineral Carbonation," proceedings of the 5th International Conference on Greenhouse Gas Control Technologies, Australia, Aug. 2000.

Anon, "Annual Average US Energy Prices: Base Case," Energy Information Administration/Short-Term Energy Outlook, Nov. 2002.

DeCarolis, J. F., et al., "Response to Jacobson and Masters: the Real Cost of Wind Energy," Science, vol. 294, No. 5544, p. 1000-1003, 2001.

Hoffert, M. I., et al., "Advanced Technology Paths to Global Climate Stability: Energy for a Greenhouse Planet," Science, vol. 298, p. 981-987, Nov. 2002.

Keeling, C. D., et al., "International Extremes in the Rate of Rise of Atmospheric Carbon Dioxide Since 1980," Nature, 375, p. 666-670, 1995.

Lackner, K. S., "Carbonate Chemistry for Sequestering Fossil Carbon," Annual Review of Energy and Environment, vol. 27, p. 193-202, 2002.

Lackner, K. S., et al., "Carbon Dioxide Disposal in Carbonate Minerals," Energy 20, p. 1153-1170, 1995.

Lackner, K. S., et al., "Magnesite Disposal of Carbon Dioxide," the Proceedings of the 22nd International Technical Conference on Coal Utilization & Fuel Systems, Mar. 16-19, 1997, Clearwater, Florida, U.S.A., 419-430.

Lackner, K. S., et al., "Carbon Dioxide Extraction From Air: Is it an Option?," Technical Report LA-UR-99-583, Los Alamos National Laboratory, Los Alamos, NM, 1999.

O'Connor, W. K., et al., "Carbon Dioxide Sequestration by Ex-Situ Mineral Carbonation," Second Dixy Lee Ray Memorial Symposium: Utilization of Fossil Fuel-Generated Carbon Dioxide in Agriculture and Industry, Aug. 31-Sep. 2, 1999, Washington, D.C.

O'Connor, W. K., et al., "Carbon Dioxide Sequestration by Direct Mineral Carbonation With Carbonic Acid," proceedings, 25th International Technical Conference on Coal Utilization & Fuel Systems, Coal Technology Association, Mar. 6-9, 2000, Clearwater, Florida.

O'Connor, W. K., et al., "Carbon Dioxide Sequestration by Direct Mineral Carbonation: Process Mineralogy of Feed and Products," Preprint 01-91 SE Annual Meeting, Feb. 26-28, Denver, Colorado, 2001.

Rogner, H. H., "An Assessment of World Hydrocarbon Resources," Annu. Rev. Energy Environ., vol. 22, p. 217-262, 1997.

Seabright, J., "Environmental Enterprise: Carbon Sequestration Using Texaco Gasification Process," First National Conference on Carbon Sequestration, May 14-17, 2001.

Yegulalp, T. M., et al., "A Review of Emerging Technologies for Sustainable Use of Coal for Power Generation," International Journal of Surface Mining, Reclamation and Environment, vol. 15, p. 52-68, Swets & Seitlinger, 2001.

Ziock, H. J., et al., "Zero Emission Coal Power, a New Concept," First National Conference on Carbon Sequestration, May 14-17, 2001.

Ziock, H. J., et al., "Technical Progress in the Development of Zero Emission Coal Technologies," Presented at Pittsburg Coal Conference, LA-UR-02-5969, 2002.

International Searching Authority, "International Search Report and the Written Opinion," sent Dec. 5, 2007 in regards to International Application No. PCT/US2006/014496.

* cited by examiner

US 8,163,065 B2

CARBON DIOXIDE PERMEABLE MEMBRANE

CROSS REFERENCE TO RELATED APPLICATION(S)

This application is a continuation of U.S. application Ser. No. 11/874,707 (issuing as U.S. Pat. No. 7,909,911 on Mar. 22, 2011), filed Oct. 18, 2007, which is a national phase application of International Application Number PCT/US2006/014496, filed Apr. 18, 2006, which claims the benefit of U.S. Provisional Application No. 60/672,399, filed Apr. 18, 2005, each of which is incorporated by reference as if disclosed herein in its entirety.

BACKGROUND

Due to a growing concern over greenhouse gas emissions, the development of technologies for separating carbon dioxide from gaseous process streams has gained in importance. In the future, power plants that generate electricity from coal, or other carbon-based fuels, may have to separate carbon dioxide from the gas stream. Chemical routes to hydrogen production from coal and natural gas rely on carbon dioxide separation that can be greatly simplified with the availability of high temperature carbon dioxide selective membranes. Solid oxide fuel cell (SOFC) designs that operate on carbon monoxide or hydrogen and carbon monoxide mixtures can benefit from the ability to separate carbon dioxide from the exhaust stream.

Methods conventionally used to separate carbon dioxide from a gas stream include chemical absorption using amine-based solvents or physical sorption using liquid or solid sorbents. However, these methods require that the gas mixture be at a temperature no higher than 100 degrees Celsius. Further, the energetic and economic penalties, incurred mostly from sorbent regeneration, are costly. At elevated temperatures, solid chemical absorbers, like lime, lithium zirconate, or lithium silicate, have been proposed but their use is complicated by slow kinetics and large material handling systems for solids.

Polymer and inorganic microporous membranes for carbon dioxide separation exist, but so far are limited by low selectivity or permeability, and low temperature operation. Particularly in gasification-based systems, it would be desirable to have carbon dioxide separation membranes that can operate in the temperature regime in which gasification or hot gas cleanup occurs. Attempts have been made to construct membranes from solid sorbents, such as lithium zirconate. However, these efforts so far have failed to produce viable membranes. Dense, dual-phase metal-carbonate membranes that operate by transporting carbon dioxide across as a carbonate ion in a molten carbonate phase, with a counter-current of electrons transporting in a metallic phase have also been proposed to produced membranes capable of operating at about 450-650 degrees Celsius. This technology, however, is limited by the requirement of having oxygen in the feed stream to convert the carbon dioxide ($CO_2$) to carbonate ($CO_3$), thus making it impractical for separation in fuel streams.

Mixtures of lithium carbonate and zirconia are known to react under low partial pressures of carbon dioxide to form lithium zirconate upon releasing gas phase carbon dioxide. The reaction can be reversed to utilize lithium zirconate as a chemical carbon dioxide absorption technology. As a result, lithium zirconate has recently been investigated as a membrane structure. However, selectivity of carbon dioxide over other gases was very poor, e.g., selectivity of carbon dioxide over methane was about five. In an economic evaluation of carbon dioxide removal from coal-fired flue gas streams, it has been estimated that in order to make membrane separation competitive with other carbon capture technologies, selectivity for carbon dioxide over other molecules should exceed 200.

SUMMARY

A carbon dioxide permeable membrane is disclosed. In some embodiments, the membrane includes the following: a body having a first side and an opposite second side; a plurality of first regions formed from a molten carbonate, the molten carbonate being solid at a temperature up to about 400 degrees Celsius and being molten from about 400 degrees Celsius to about 1200 degrees Celsius, the plurality of first regions forming a portion of the body and the plurality of first regions extending from the first side of the body to the second side of the body; a plurality of second regions formed from an oxygen conductive solid oxide, the plurality of second regions combining with the plurality of first regions to form the body and the plurality of second regions extending from the first side of the body to the second side of the body; and wherein the body is configured to allow carbon dioxide to pass from the first side to the second side.

A method of separating carbon dioxide from a mixture of gaseous molecules is disclosed. In some embodiments, the method includes the following: providing a carbon dioxide permeable membrane formed from a plurality of second regions including an oxygen conductive solid oxide and a plurality of first regions including molten carbonate, the membrane having a first side and an opposite second side; directing a flow of the mixture of gaseous molecules toward the first side of the membrane, the mixture of gaseous molecules having a temperature of about 200 to 1200 degrees Celsius; creating a partial pressure difference of carbon dioxide from the first side of the membrane to the second side of the membrane; driving a flux of carbonate ions from the first side of the membrane to the second side of the membrane; and driving a flux of oxide ions from the second side of the membrane to the first side of the membrane.

A method of producing a carbon dioxide permeable membrane is disclosed. In some embodiments, the method includes the following: forming a body substantially from an oxygen conductive solid oxide; creating pores in the body to define a porous continuous structure; and filling the pores of the porous continuous structure with a molten carbonate, wherein the molten carbonate is solid at a temperature up to about 400 degrees Celsius and is molten from about 400 degrees Celsius to about 1200 degrees Celsius.

BRIEF DESCRIPTION OF THE DRAWINGS

The drawings show embodiments of the disclosed subject matter for the purpose of illustrating the invention. However, it should be understood that the present application is not limited to the precise arrangements and instrumentalities shown in the drawings, wherein.

DETAILED DESCRIPTION

Figure 1:
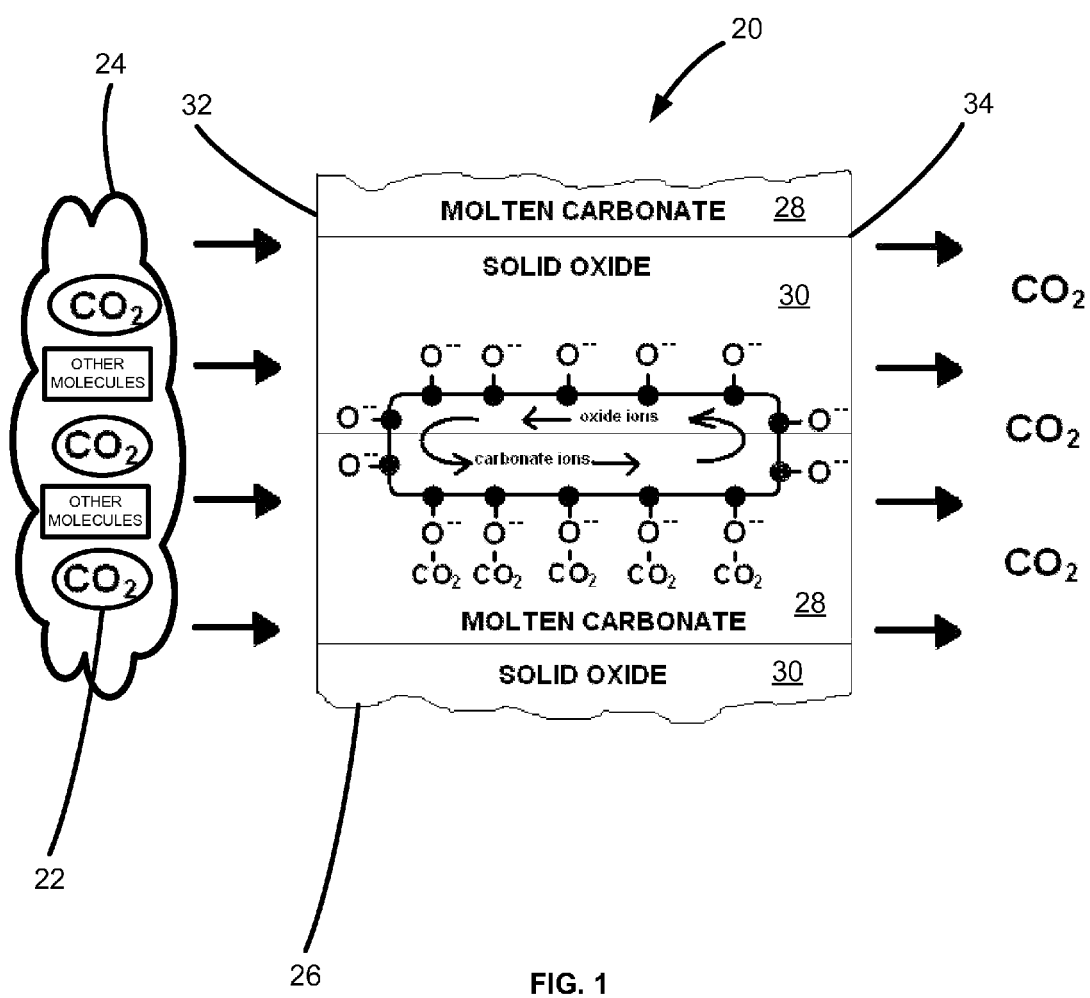
FIG. 1 is a schematic diagram of a membrane according to some embodiments of the disclosed subject matter.
Figure 2:
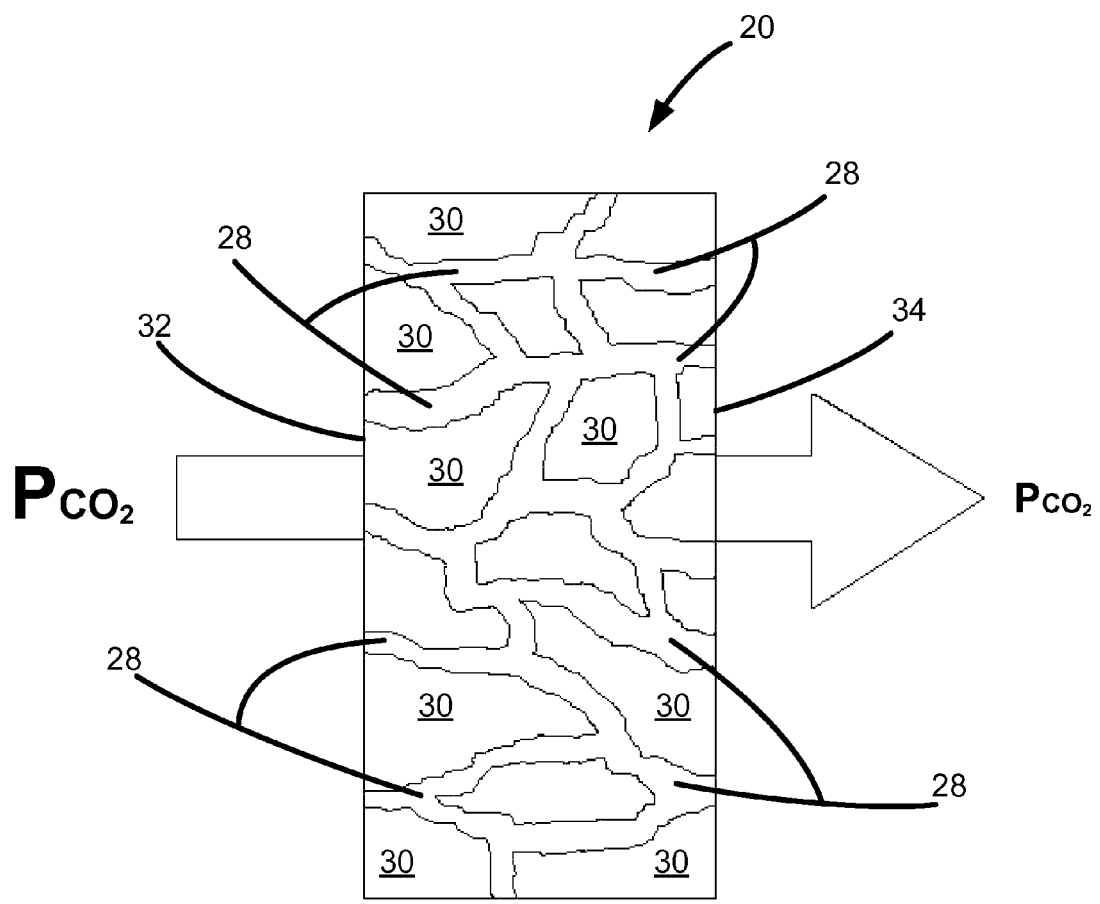
FIG. 2 is a cross-sectional view of a membrane according to some embodiments of the disclosed subject matter.

Referring now to the drawings and in particular to FIGS. 1 and 2, one aspect of the disclosed subject matter relates to a carbon dioxide permeable membrane 20 that can be used to separate carbon dioxide 22 from a mixture 24 of gaseous molecules. In some embodiments, membrane 20 includes a body 26 formed from a plurality of first regions 28 ("regions 28") including molten carbonate and a plurality of second regions 30 ("regions 30") including an oxygen conductive solid oxide.

In some embodiments, membrane 20 allows a neutral molecule to undergo a chemical reaction on one side of the membrane and combine with an ion creating a new ion to be transported across the membrane and dissociates on the other side of the membrane releasing an ion and becoming again a neutral molecule. In some embodiments, membrane 20 carries a net zero electric current and can be driven by partial pressure differences of the neutral species from one side of the membrane to the other side of the membrane.

Membrane 20 works with materials having one region that is able to conduct oxide ions and another region that is able to conduct carbonate ions. The two regions can be brought into sufficient contact with each other or through one or more intervening regions to build-up a charge on the regions. The charge can drive a flux of carbonate ions across the region that is capable of conducting oxide ions.

Examples of suitable materials for use in fabricating membrane 20 include, but are not limited to, a selective carbon dioxide permeable composition, which is stable and long lasting under the conditions of preparation and operation at high temperatures.

By choosing the materials of the two regions appropriately, one can adjust the operational temperature range of membrane 20. Moreover, in some embodiments, the materials used to form membrane 20 can differ by the cation mixture in the carbonate region and by admixtures to the solid oxide region and the carbonate region to enhance stability, ion permeability, and selectivity of the membrane. A net neutral carbon dioxide flux can be measured using dynamic pressure measurements and gas chromatography. Use of other gases or an admixture of other gases can establish the selectivity of membrane 20 for carbon dioxide over a range of temperatures.

Referring still to FIGS. 1 and 2, body 26 of membrane 20 can be formed in various shapes, which include but are not limited to a disk, plate, cylinder, cube, tube, film, or sheet. Regardless of its shape, body 26 includes a first side and a side opposite the first side, for example, first side 32 and an opposite second side 34. Body 26 is configured to allow carbon dioxide to pass from first side 32 to second side 34. As best illustrated in FIG. 2, body 26 is configured so that a partial pressure difference of carbon dioxide from first side 32 of membrane 20 to second side 34 of the membrane drives a flux of oxide ions in regions 30 and a flux of carbonate ions in regions 28. The partial pressure difference is caused as the driven flow of mixture 24 encounters the resistance of membrane 20 thereby reducing the flow rate of the mixture and increasing the pressure on first side 32 as compared to the pressure on second side 34 where the mixture is no longer impeded by the membrane. In some embodiments, a flux of carbonate ions travels from first side 32 of membrane 20 to second side 34 of the membrane and a flux of oxide ions travels from the second side of the membrane to the first side of the membrane. In some embodiments, the flow of mixture 24 can be reversed, i.e., to flow from second side 34 to first side 32. In such embodiments, the partial pressure difference is also reversed as is the direction of the flux of carbonate ions and flux of oxide ions. In some embodiments, body 26 is configured so as to be impermeable to at least carbon monoxide, but permeable to carbon dioxide. In other embodiments, body 26 can be configured so as to be impermeable to all gases other than carbon dioxide.

Regions 28 form a portion of body 26 and extend continuously from first side 32 of the body to second side 34 of the body. Regions 28 are configured to conduct carbonate ions and are typically, but not always, formed from a molten carbonate. The molten carbonate forming regions 28 are solid at a temperature up to about 400 degrees Celsius and are at least partially molten from about 400 degrees Celsius to about 1200 degrees Celsius. In some embodiments, body 26 is mechanically stable in the range of about 200 degrees Celsius to about 1000 degrees Celsius. In some embodiments, body 26 may be mechanically stable in the range of about 3000 degrees Celsius to about 10000 degrees Celsius or in the range of about 5000 degrees Celsius to about 10000 degrees Celsius. In some embodiments, regions 28 and membrane 20 are stable at room temperature. In some embodiments, membrane 20 will not conduct carbonate until the carbonate in regions 28 is molten. As explained further below, the molten carbonate in regions 28 is retained within body 26 via capillary forces, e.g., similar to how a cloth soaked in water retains the water.

In some embodiments, the carbonate in regions 28 includes, but is not limited to, alkali metal carbonates such as sodium, potassium, and lithium carbonates and eutectics or admixtures thereof. Other examples include eutectics involving calcium, barium, or magnesium carbonates. The carbonate material used in regions 28 can depend on the pressure and temperature operating range of membrane 20. For example, the carbonate in regions 28 can be molten and retain enough carbonate ions to remain conductive under the prevailing conditions, i.e., the carbonate dissociation equilibrium will not be shifted far to the right.

Materials with low melting points and high carbonate ion conductivities, such as binary and ternary mixtures of alkali metal carbonates, can also be suitable for use as molten carbonate materials in regions 28. For example, lithium and sodium mixtures having a conductivity of about 2.5 S/cm at 700 degrees Celsius and a eutectic melting point at 501 degrees Celsius can be suitable (see Table 1). Lithium is an effective ion for depressing a mixture melting temperature and for increasing conductivity due to its small size. Mixtures that do not form eutectics can also be used. For example, sodium and potassium mixtures alone do not form a eutectic mixture, but the melting point of the mixture (710 degrees Celsius) can be depressed below those of the individual salts (Tm of $Na_2CO_3$=851 degrees Celsius and Tm of $K_2CO_3$=891 degrees Celsius).

TABLE 1

Potential Alkali Metal Carbonate Salts

| Carbonate Mixture (Li/Na/K - mol %) | Melting Point (degrees Celsius) (1 atm) | Conductivity (S/cm) | |
|---|---|---|---|
| | | (600 degrees Celsius) | (700 degrees Celsius) |
| 100/00/00 | 726 | — | — |
| 00/100/00 | 858 | — | — |
| 00/00/100 | 899 | — | — |
| 52/48/00* | 501 | 1.86 | 2.49 |
| 43/00/57* | 498 | 0.97 | 1.39 |
| 62/00/38* | 488 | 1.30 | 1.74 |
| 00/41/59 | 710 | — | ~1.5 |
| 43/31/25* | 397 | 1.22 | 1.72 |

*eutectic mixture

In some embodiments, certain alkali metal carbonates can combine to form a third region, such as a different solid metal oxide, e.g., zirconate or equivalent salt formations, at the carbonate/oxide interface. For example, as described above, zirconia ($ZrO_2$) and lithium carbonate ($Li_2CO_3$) can react together at elevated temperatures, e.g., about 700 degrees Celsius and higher, to form a solid lithium zirconate (Li$_2$ZrO$_3$) and carbon dioxide gas.

In some embodiments, alkali metal carbonates can be doped with low portions of alkali earth carbonates to help maintain the oxobasicity of the solvent, which reduces both decomposition and volatility.

In some embodiments, molten carbonate regions that can wet the surface of solid oxide regions, e.g., those having approximately a zero degree contact angle, can be utilized to provide sufficient capillary force to hold the molten carbonate salt in the pores of a solid oxide region. The maximum pore size at the edges of membrane 20 for a given pressure drop across the membrane can be calculated using the molten carbonate surface tension and contact angle between the molten carbonate and the oxide interface. The size of the pores in regions 30 can be controlled such that it is small enough to withstand 10-20 atm total pressure drop across membrane 20. Capillary force is indirectly proportional to the pore radius. The pore structure within the bulk of the material, i.e., away from the edges, can behave differently than as described above. For example, in some embodiments, membrane 20 includes a material with large pores on the inside and a thin layer of small pores on the outside designed to contain the molten carbonate inside body 26.

Immobilizing the molten carbonate salt of regions 28 in a solid oxide porous matrix, i.e., regions 30, can further allow coupling of the flux of carbonate ions to oxide vacancies. Immobilization in a porous structure can also serve to depress the possibility of gas-phase species from simply diffusing through the molten phase.

Regions 30 are combined with regions 28 to form body 26. Each of regions 30 extends continuously from first side 32 of body 26 to second side 34 of the body and is formed from an oxygen conductive solid oxide. As best illustrated in FIG. 2, regions 30 complete the circuit of carbon dioxide transport without an addition external electromotive force (emf) and also provide mechanical support by immobilizing the molten carbonate, i.e., regions 28, within its porous structure. Membrane 20 is continuous with respect to each of regions 28 and 30 independently within a 3 dimensional structure.

Regions 30 are configured to conduct oxide ions and separate carbon dioxide from other gaseous molecules. In some embodiments, membrane 20 cannot begin to separate carbon dioxide until regions 30 become conductive at elevated temperatures such as around 400 degrees Celsius or higher.

In some embodiments, regions 28 and 30 are in contact with each other and both react with carbon dioxide to form a layer of lithium zirconate between the two regions. For example, a bi-continuous membrane consisting of zirconia and lithium carbonate at low partial pressures of carbon dioxide over the system can release carbon dioxide and transform itself into a new region of lithium zirconate. The mobility of lithium ions can help in transferring the oxide ion (that just released carbon dioxide) from the carbonate region, i.e., regions 28, into the zirconia face by allowing charge neutrality conditions to be more easily maintained during such transfer. Similarly, on the other side, transfer of the oxide ion from the zirconia region, i.e., regions 30, back into the carbonate region can be facilitated as described above.

In some embodiments, less miscible carbonates can be used in regions 28. For example, potassium carbonate or sodium carbonate can be utilized. In such embodiments, regions 30 can be surface treated with a catalyst that promotes transfer of oxide ions from the plurality of second regions to regions 28 when separating carbon dioxide. For example, catalysts, such as platinum and nickel oxides, can be suspended on the solid oxide phase. Such surface treatments are not limited to non-miscible carbonates.

As illustrated in FIGS. 1 and 2, acceptable solid oxides can provide pathways for an oxide counter current as well as the structural support of the membrane. Solid oxides that have at least 0.01 S/cm conductivity at operating temperatures ranging from 600-900 degrees Celsius are suitable. Solid oxides that are resistant to chemical attack by the impregnated molten carbonate mixture and have the ability to withstand the significant chemical potential gradients of gas mixture compositions are suitable. Thermal shock resistance and thermal expansion coefficients of the solid oxides can be considered to ensure the stability of the porous structure to allow mechanical stabilization of membrane 20.

It is not uncommon for solid oxide materials to exhibit n-type electronic conductivity along with oxide conductance. This is due to the presence of cations that can undergo valency transitions depending on the reducing or oxidizing environment, and the oxide releasing gas phase oxygen to accommodate the charge imbalance. The proportion of a material's total conductivity due to an electronic current is called the electronic transference number, $t_{el}$. Similarly, the proportion of the conduction due to oxide transport is the ionic transference number, $t_{ion}$. The range of oxygen chemical potential and temperature over which a material can remain predominately ionically conductive ($t_{ion}>0.99$) is called the electrolytic domain. In some embodiments, membrane 20 can be designed to allow the internal short-circuit of the carbonate ions to come predominantly from the oxide ions. The ability of a solid oxide material to conduct electrons does not decrease or hinder the flux of oxide ions. Without a sink or source of electrons present within the membrane materials or gas phases, an electrical current is not typically established.

Suitable solid oxide materials that can be used in regions 30 include, but are not limited to, zirconium (IV) oxide, cerium (IV) oxide, stabilized bismuth (III) oxide, SFC (Sr—Fe—Co oxides), ABO$_{3\Delta}$ (general perovskite crystalline structure, exhibits oxide ionic and electronic conductivity), and combinations thereof. For example, in some embodiments, the solid oxide phase is made of zirconia or various forms of stabilized zirconia. Zirconia can be stabilized with MgO, Y$_2$O$_3$, CaO, or the like. In some embodiments, a more specific example of the perovskite is SrCO$_{0.8}$Fe$_{0.2}$O$_{3\Delta}$.

Some potential solid oxide materials for use in regions 30 are listed in Table 2 as follows:

TABLE 2

Potential Solid Oxide Materials

| Oxide | Conductivity (S/cm) | | Electrolytic Domain (Po$_2$, atm) |
|---|---|---|---|
| | (600 degrees Celsius) | (800 degrees Celsius) | |
| YSZ-10 | 0.00 | 0.03 | 200 × 10$^{-25}$ |
| CGO-10 | 0.04 | 0.20 | Poor at low Po$_2$ |
| δ-Bi$_2$O$_3$ | NA | >1 | Poor at low Po$_2$ |
| LSGM | 0.03 | 0.10 | 1 × 10$^{-21}$ |

The first class of materials, encompassing the first two species in Table 2, yttria stabilized zirconia (YSZ) and gadolinium stabilized ceria (CGO), are oxides with a cubic fluorite structure. The most common of these materials, used as SOFC electrolyte, can be stabilized zirconia (SZ). Pure zirconia has a monoclinic structure up to 1000 degrees Celsius. Oxides that have a similar radius and more ionic character than zirconia can be mixed at low levels to stabilize a cubic fluorite structure. An effective dopant is yttria, $Zr_{1-x}Y_xO_{(2-x/2)}$, with the highest conductivity levels attained where x=0.8 to about 0.11.

Doped ceria materials can offer higher conductivities at certain temperatures. Gadolinium or samarium doped ceria from about 10-20% can provide high ionic conductivities, e.g., CGO-10, CGO-20, and the like. For example, at 600 degrees Celsius, the ionic conductivity is approximately $4 \times 10^{-2}$ S/cm.

For some applications, additional examples of suitable solid oxide materials for use in regions 30 can be found among oxides having high electron conductivity. For example, despite high electronic conductivity and low mechanical strength, a fluorite material known for its extremely high conductivity, $\delta\text{-}Bi_2O_3$, can be a suitable oxide material. $\delta\text{-}Bi_2O_3$ has an ionic conductivity that is greater than 1 S/cm at 750 degrees Celsius. Bismuth oxide is an example of an intrinsic oxide conductor with every fourth oxide site vacant. Of course, for applications such as fuel cells, oxides having high electron conductivity would likely not be suitable.

Structures with higher oxide conductivities than those of cubic fluorite can be found in the perovskite series. Perovskite structures of the $LaGaO_3$ family are an example. Doping of the lanthanum with strontium and magnesium for gallium can create the oxide vacancies, $La_{0.9}Sr_{0.1}Ga_{0.9}Mg_{0.2}O_{3-d}$ (LSGM).

In some embodiments, carbon dioxide can be transported across membrane 20 in one of regions 28 and 30 as a carbonate ion, converted with an oxide ion. The oxide ion can either be dissolved within the molten carbonate of regions 28 or transferred directly from a lattice site at the boundary of region 30 into the carbonate region. The dissolution of an oxide ion into the carbonate region, i.e., regions 28, can result in a vacant lattice site in the solid oxide region, i.e., regions 30, that is filled by the conductive oxide ions compensating for the carbonate flux. Such a vacant lattice site that is filled by conductive oxide ions eliminates the need for molecular oxygen to contact membrane 20 along with the carbon dioxide.

Figure 3:
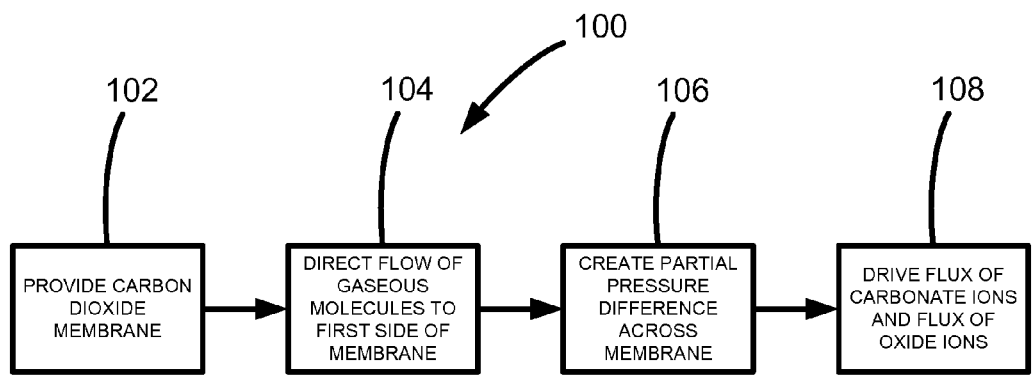
FIG. 3 is a diagram of a method according to some embodiments of the disclosed subject matter.

Referring now to FIG. 3, some embodiments include a method 100 of separating carbon dioxide from a mixture of gaseous molecules. The mixture of gaseous molecules can be a fuel gas, an exhaust gas, or other gases. Generally, but not always, the mixture of gaseous molecules includes one or more of hydrogen, oxygen, carbon monoxide, nitrogen, methane, and steam and has a temperature of about 400 to 1000 degrees Celsius. At 102, a carbon dioxide permeable membrane is provided. The carbon dioxide permeable membrane provided is formed from a plurality of second regions including an oxygen conductive solid oxide and a plurality of first regions including molten carbonate. The carbon dioxide permeable membrane provided includes a first side and an opposite second side. At 104, a flow of the mixture of gaseous molecules is directed toward the first side of the membrane. The mixture of gaseous molecules has a temperature of about 200 to 1200 degrees Celsius. At 106, a partial pressure difference of carbon dioxide from the first side of the membrane to the second side of the membrane is created. The partial pressure difference of the carbon dioxide on the two sides of the membrane is the driving force for the transport of molecules across the membrane. Carbon dioxide can flow in either direction of the membrane and the actual flow will follow the pressure difference. At 108, the partial pressure difference of the carbon dioxide drives a flux of carbonate ions from the first side of the membrane to the second side of the membrane. Then, at 108, the partial pressure difference of the carbon dioxide drives a flux of oxide ions from the second side of the membrane to the first side of the membrane.

Figure 4:
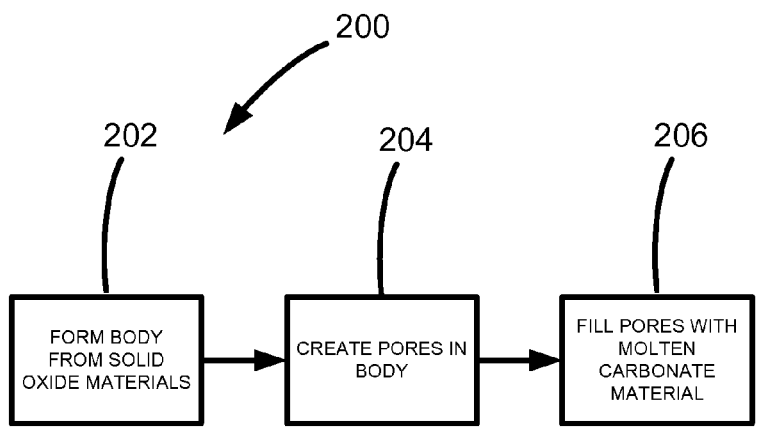
FIG. 4 is a diagram of a method according to some embodiments of the disclosed subject matter.

Referring now to FIG. 4, some embodiments include a method 200 of producing a carbon dioxide permeable membrane. At 202, a body is formed substantially from an oxygen conductive solid oxide material. At 204, pores are created in the body to define a porous continuous structure. At 206, the pores of the porous continuous structure are filled with a molten carbonate that is solid at a temperature up to about 400 degrees Celsius and is molten from about 400 degrees Celsius to about 1200 degrees Celsius. In some embodiments, the molten carbonate is lithium carbonate and the conductive solid oxide is stabilized zirconia.

Porous membrane structures of the conducting solid oxide material, i.e., a body formed from regions 30, can be fabricated with various different techniques. In some embodiments, porous membrane structures of the conducting solid oxide material are formed using a technique known as tape casting. Tape casting can allow for careful control of porosity, thickness, and density and can also tolerate co-sintering of multiple layers. Tape casting initially involves the formation of a workable film, i.e., tape, containing ceramic particles suspended inside a polymer matrix. Within this matrix, pore formers, particles of graphite, starch, polycarbonate, or polyethylene that will burn out during the sintering process, can also be included to create an engineered porous structure. Poreformers are organic or carbon particles that are mixed in with ceramic precursors that are later be burnt-out during sintering. The final structure is largely independent on the sintering conditions. In some embodiments, continuous porosity can be achieved with greater than 20% of the solids loading of the poreformers. The final porous character of the membrane can be analyzed using mercury porosimetry and a scanning electron microscope (SEM).

The pore sizes selected are limited by the ability of the solid oxide to retain the molten carbonate, which depends on the capillary forces and in turn on the wetting properties of the molten carbonate on the solid oxide. In addition, the pressure gradient across the membrane also impacts the pore sizes selected. The higher the pressure gradient across the membrane, the smaller the pores have to be. The size of the pores in regions 30 can be controlled such that it is small enough to withstand 10-20 atm total pressure drop across membrane 20. Capillary force is indirectly proportional to the pore radius. The smaller the pore size, the longer it will take to fill them with molten carbonate. The pore sizes must be small enough to prevent the molten carbonate from leaking considering all other conditions. The smallest pore volume fraction to ensure a continuous or connected porous structure is about 20 percent.

Tape casting to form a porous structure begins by dissolving a dispersant and suspending individual ceramic and pore forming particles using an organic or aqueous solvent. Examples of dispersant materials include, but are not limited to, polyisobutylene, linoleic acid, oleic acid, lanolin fatty acids, blown menhaden fish oil, and the like. Once the particles are separated, binders are added to suspend the particles in a viscous fluid that can be cast into a thin film. Examples of binder materials include, but are not limited to, polyvinyl alcohol, polyvinyl butyral, cellulose, and the like. Further additives, such as plasticizers can be added to control the flexibility and rheology of the suspension. Examples of plasticizers include, but are not limited to, poly(ethylene)glycol, poly(propylene)glycol, n-butyl phthalate, dioctyl phthalate, and the like. For a viscous slip, parameters such as solids loading, binder/dispersant loading, milling time of powder with binder/dispersant, and mill speed can be optimized. Once cast onto a mylar film, the organic solvent evaporates causing the film to shrink and bringing the particles close together. What remains is a polymer matrix suspending ceramic particles and poreformers, which is known as a green body. The green body can be cut or punched to form a desired two-dimensional geometry. Additionally, other layers can be cast upon or within the green body, to create a laminated or framed structure. When the green body is fired, the organic binders, poreformers, and other organic additives within the slip can be burnt out, and the particles can be sintered together.

In other embodiments, the tape casting process can allow for a porous solid oxide disk to be co-sintered inside a dense solid oxide frame in order to create a dense surface to form a seal against certain regions of the porous solid oxide disk. This can be accomplished due to the nature of the tape casting process by either including pore forming agents to create a porous structure, or excluding them, resulting in a dense structure. To begin a slip containing the solid oxide powder, dispersant, binder, plasticizers, and solvent can be cast. Upon solvent dryout, a void space can be cut out of the tape and filled with a slip containing the same mixture including poreformers. Upon sintering, the additives, such as the dispersant, binder, plasticizers and poreformers, can be burnt out, leaving a porous solid oxide structure surrounded by a dense solid oxide structure.

After sintering, infiltration of the molten carbonate phase into the pores can be carried out. Both the molten salt and the membrane can be heated to the same temperature, and then the membrane can be dipped into the molten carbonate mixture. The porous solid oxide can be heated to be as hot as the molten carbonate to avoid cooling and solidifying of the salt once it contacts the membrane surface. Molten carbonate uptake can occur via capillary forces drawing the liquid into the solid oxide pore space. Upon cooling, the infiltrated membrane can be analyzed with SEM and or energy dispersive X-ray spectroscopy (EDS) on both faces to examine if the carbonate infiltrated the entire thickness. X-ray diffraction (XRD) can also be used to detect the phases present on the surface.

A carbon dioxide membrane as disclosed herein can be used to improve various known systems and processes. For example, membrane 20 or a variation thereof can be included in a zero-emission coal-based electric power plant or used in combination with a SOFC.

When used in a SOFC, the carbon dioxide separation membrane can be operating from about 600 degrees Celsius to about 900 degrees Celsius. Membrane 20 can be useful in operating a SOFC system that operates on a pure carbon fuel source. The fuel to be oxidized at the anode compartment of the cell stack can be carbon monoxide, which is generated by a gasification reaction of carbon with carbon dioxide, e.g., the Boudouard reaction.

Since it can be inefficient to drive the CO oxidation in the fuel cell to completion, a better strategy is to remove excess product carbon dioxide from a reactor by letting it escape from the reaction vessel through a high temperature selective membrane that is impermeable to CO, e.g., membrane 20 as described herein. Carbon monoxide would not be depleted in the chamber, because additional CO would be generated in the fuel chamber by gasifying a stream of injected carbon. Such a fuel cell can be maintained near the equilibrium point of the Boudouard reaction with the carbon dioxide selective membrane removing the net production of carbon dioxide and maintaining the fuel chamber at relatively steady state conditions. In contrast, conventional fuel cell designs tend to drive the fuel content to depletion. Operating near steady state entirely avoids the usually obligatory post-combustion of remnant fuel in the exhaust of the fuel cell stack. The gasification reaction can be performed in a nearly reversible fashion and thus would not consume any of the free energy originally available in the carbon fuel. This design would naturally collect carbon dioxide and ready it for subsequent disposal.

Other applications for high temperature carbon dioxide membranes include carbon dioxide capture in power plants that capture carbon dioxide from the exhaust stream, but also for promoting water gas shift reactions by removing carbon dioxide from the reaction zone. For example, the carbon dioxide separation membrane can have an operation temperature of about 400 degrees Celsius to about 600 degrees Celsius when used in promoting water gas shift reactions. In other embodiments, a membrane according to the disclosed subject matter can be used in energy producing devices, fuel synthesis, carbon chemistry methods, steel making processes and systems, aluminum smelter, and other metallurgical processes.

Power plant designs that rely on the recirculation of only partially combusted or oxidized flue gases can benefit greatly from the availability of membranes that can perform the separation at the process temperature, e.g., in excess of 400 degrees Celsius and as high as 1000 degrees Celsius. The efficiency of recirculating the remaining gas can be greatly increased if the gas can retain its sensible heat and does not have to be subjected to a cooling and heating cycle in order to allow for the removal of carbon dioxide. Zero emission power plants avoid smoke stacks by limiting the inputs to oxygen and carbonaceous fuels. A signature feature of these power plant designs is that they recirculate the exhaust gases in order to gasify the input fuel or in some cases to dilute the input stream. Nevertheless, as carbon dioxide and steam is produced, these two components will have to be separated individually from the exhaust stream. The recirculating gas stream contains increasing amounts of carbon dioxide that must be removed for sequestration and steam that must be condensed out. An important unit process in such a power plant may be a separation unit that can remove carbon dioxide from the product stream into a separate sequestration-ready stream. Membranes according to the disclosed subject matter also allow a simple recovery of carbon dioxide in fuel gas streams.

Most hydrocarbon gasification scheme to produce a hydrogen rich fuel makes use of the water gas shift reaction as shown in the following equation [1]:

$$CO+H_2O \leftrightarrow CO_2+H_2 \qquad [1].$$

By providing a separation membrane that can operate at higher temperatures typical of the water gas shift process (200-400 degrees Celsius), the removal of carbon dioxide would shift the water gas shift reaction further to the right. Further, the mechanical stability provided by membranes produced according to the disclosed subject matter can enable operating the system under high-pressure conditions, resulting in an added equilibrium shift to the right since the preferential removal of carbon dioxide would offset the high-pressure conditions. A pressurized system can also have the dual benefit of providing $H_2$ already at high pressures, thereby minimizing the energy to later compress the fuel for storage.

Direct steam methane reforming (SMR) is another application where a carbon dioxide membrane according to the disclosed subject matter can be utilized. However, in this application, the system can be limited to low-pressure operation. Gasification of a more carbon rich fuel, such as biomass, oil, coal, or charcoal, with oxygen or steam can contain a larger concentration of carbon dioxide product gas that would favor the use of a high temperature and pressure membrane separation.

Although the disclosed subject matter has been described and illustrated with respect to embodiments thereof, it should be understood by those skilled in the art that features of the disclosed embodiments can be combined, rearranged, etc., to produce additional embodiments within the scope of the invention, and that various other changes, omissions, and additions may be made therein and thereto, without parting from the spirit and scope of the present application.

What is claimed is:

1. A carbon dioxide permeable membrane, said membrane comprising:
    a body having a first side and an opposite second side;
    a plurality of first regions formed from a carbonate, wherein said plurality of first regions are configured to conduct carbonate ions;
    a plurality of second regions formed from an oxygen conductive solid oxide, wherein said plurality of second regions are configured to conduct oxide ions and separate carbon dioxide from other gaseous molecules and said plurality of second regions are surface treated with a catalyst that promotes transfer of oxide ions from said plurality of second regions to said plurality of first regions when separating carbon dioxide; and wherein said body is configured to allow carbon dioxide to pass from said first side to said second side.

2. The membrane according to claim 1, wherein said carbonate is at least partially molten when above a temperature of about 400 degrees Celsius.

3. The membrane according to claim 1, wherein said plurality of first regions forming a portion of said body and said plurality of first regions extending from said first side of said body to said second side of said body.

4. The membrane according to claim 3, wherein said plurality of second regions combine with said plurality of first regions to form said body and said plurality of second regions extending from said first side of said body to said second side of said body.

5. The membrane according to claim 1, wherein said body is configured so that a partial pressure difference of carbon dioxide from one of said first and second sides of said body to an opposite side of said body drives a flux of oxide ions in said plurality of second regions and a flux of carbonate ions in said plurality of first regions.

6. The membrane according to claim 5, wherein said body is configured so that said flux of carbonate ions travels from one of said first and second sides of said body to an opposite side of said body and said flux of oxide ions travels from one of said first and second sides of said body to an opposite side of the body.

7. The membrane according to claim 1, wherein said plurality of second regions and said plurality of first regions are configured so as to be impermeable to carbon monoxide.

8. The membrane according to claim 1, wherein said plurality of first regions are formed from lithium carbonate and said plurality of second regions are formed from stabilized zirconia.

9. The membrane according to claim 8, further comprising a layer of lithium zirconate between said plurality of second regions and said plurality of first regions.

10. The membrane according to claim 1, wherein said plurality of second regions include pores and said plurality of first regions are positioned inside pores of said plurality of second regions.

11. The membrane according to claim 1, wherein said membrane is in the form of a disk, plate, cylinder, cube, tube, film, or sheet.

12. The membrane according to claim 1, wherein said molten carbonate includes at least one of lithium carbonate, potassium carbonate, sodium carbonate, and mixtures thereof.

13. The membrane according to claim 1, wherein said solid oxide includes at least one of zirconia, zirconia doped with magnesium oxide, calcium oxide, and ytrria, ceria, ceria doped with gadolinium or samarium, δ-Bi2O3, perovskites within the LaGaO3 family, and mixtures thereof.

14. A method of separating carbon dioxide from a mixture of gaseous molecules, said method comprising:

providing a carbon dioxide permeable membrane formed from a plurality of second regions including an oxygen conductive solid oxide and a plurality of first regions including molten carbonate, said membrane having a first side and an opposite second side, wherein said plurality of first regions are configured to conduct carbonate ions, said plurality of second regions are configured to conduct oxide ions and separate carbon dioxide from other gaseous molecules, and said plurality of second regions are surface treated with a catalyst that promotes transfer of oxide ions from said plurality of second regions to said plurality of first regions when separating carbon dioxide;

directing a flow of said mixture of gaseous molecules toward said first side of said membrane;

creating a partial pressure difference of carbon dioxide from said first side of said membrane to said second side of said membrane;

driving a flux of carbonate ions from said first side of said membrane to said second side of said membrane; and driving a flux of oxide ions from said second side of said membrane to said first side of the membrane.

15. The method according to claim 14, wherein said mixture of gaseous molecules has a temperature of about 200 to 1200 degrees Celsius.

16. The method according to claim 14, wherein said mixture of gaseous molecules includes one or more of hydrogen, oxygen, carbon monoxide, nitrogen, methane, and steam and has a temperature of about 400 to 1000 degrees Celsius.

17. A method of producing a carbon dioxide permeable membrane, said method comprising:

forming a body substantially from an oxygen conductive solid oxide that conducts oxide ions and separates carbon dioxide from other gaseous molecules;

creating pores in said body to define a porous continuous structure; and filling said pores of said porous continuous structure with a carbonate, wherein said carbonate in said pores conducts carbonate ions; and surface treating said oxygen conductive solid oxide with a catalyst that promotes transfer of oxide ions from said oxygen conductive solid oxide to said carbonate in said pores when separating carbon dioxide.

18. The membrane according to claim 17, wherein said carbonate is at least partially molten at a temperature above about 400 degrees Celsius.

19. The membrane according to claim 17, wherein forming includes tape casting said body.

20. The membrane according to claim 17, wherein creating pores includes sintering said body.

* * * * *